US012693733B2

(12) United States Patent
Parekh et al.

(10) Patent No.: US 12,693,733 B2
(45) Date of Patent: Jul. 28, 2026

(54) ARTIFICIAL INTELLIGENCE FOR EVALUATING PATIENT DISTRESS USING FACIAL EMOTION RECOGNITION

(71) Applicant: UNIVERSITY OF MIAMI, Miami, FL (US)

(72) Inventors: Dipen J. Parekh, Miami, FL (US); Jonathan E. Katz, Miami, FL (US)

(73) Assignee: UNIVERSITY OF MIAMI, Miami, FL (US)

( * ) Notice: Subject to any disclaimer, the term of this patent is extended or adjusted under 35 U.S.C. 154(b) by 524 days.

(21) Appl. No.: 17/630,027

(22) PCT Filed: Aug. 6, 2020

(86) PCT No.: PCT/US2020/045164

§ 371 (c)(1),
(2) Date: Jan. 25, 2022

(87) PCT Pub. No.: WO2021/026329

PCT Pub. Date: Feb. 11, 2021

(65) Prior Publication Data

US 2022/0285015 A1 Sep. 8, 2022

Related U.S. Application Data

(60) Provisional application No. 62/883,386, filed on Aug. 6, 2019.

(51) Int. Cl.
*G06F 3/01* (2006.01)
*G06V 10/82* (2022.01)
(Continued)

(52) U.S. Cl.
CPC .............. *G06F 3/012* (2013.01); *G06V 10/82* (2022.01); *G06V 20/00* (2022.01); *G06V 40/172* (2022.01); *G06V 40/174* (2022.01)

(58) Field of Classification Search
None
See application file for complete search history.

(56) References Cited

U.S. PATENT DOCUMENTS

| | | | | |
|---|---|---|---|---|
| 2008/0091088 A1* | 4/2008 | Kiani | ................. | A61B 5/02455 |
| | | | | 600/301 |
| 2018/0039745 A1 | 2/2018 | Chevalier et al. | | |
| 2018/0068179 A1 | 3/2018 | Derenne et al. | | |

FOREIGN PATENT DOCUMENTS

| | | | | | |
|---|---|---|---|---|---|
| CN | 108615010 A | * | 10/2018 | ......... | G06K 9/00302 |
| CN | 109035089 A | * | 12/2018 | | |

(Continued)

OTHER PUBLICATIONS

Werner et al., "Automatic Pain Assessment with Facial Activity Descriptors," IEEE Transactions on Affective Computing, vol. 8, No. 3 , pp. 286-299 (Year: 2016).*

(Continued)

*Primary Examiner* — Vincent Rudolph
(74) *Attorney, Agent, or Firm* — Calfee, Halter & Griswold LLP

(57) ABSTRACT

Artificial intelligence for evaluating patient distress using facial emotion recognition. In an embodiment, an artificial intelligence model is applied to facial image(s) of a patient to classify each facial image into one of a plurality of emotional states based on a facial expression in the facial image. A determination may be made as to whether or not to alert a healthcare provider based on the emotional state(s) into which the facial image(s) were classified. If a determination is made to alert a healthcare provider, a notification may be transmitted to the healthcare provider.

20 Claims, 5 Drawing Sheets

(51) Int. Cl.
    *G06V 20/00*      (2022.01)
    *G06V 40/16*      (2022.01)

(56)              References Cited

FOREIGN PATENT DOCUMENTS

| | | | | |
|---|---|---|---|---|
| CN | 109460749 A | * | 3/2019 | |
| CN | 111402523 A | * | 7/2020 | ........... G06V 40/161 |
| WO | WO-2020168468 A1 | * | 8/2020 | ........... G06V 40/176 |

OTHER PUBLICATIONS

Martinez et al., "Personalized Automatic Estimation of Self-Reported Pain Intensity from Facial Expressions," 2017 IEEE Conference on Computer Vision and Pattern Recognition Workshops (CVPRW), pp. 70-79 (Year: 2017).*
International Search Report and Written Opinion for corresponding PCT/US2020/045164, mailed on Nov. 6, 2020, in 16 pages.

* cited by examiner

400

ARTIFICIAL INTELLIGENCE FOR EVALUATING PATIENT DISTRESS USING FACIAL EMOTION RECOGNITION

CROSS-REFERENCE TO RELATED APPLICATIONS

This application claims priority to U.S. Provisional Patent App. No. 62/883,386, filed on Aug. 6, 2019, which is hereby incorporated herein by reference as if set forth in full.

BACKGROUND

Field of the Invention

The embodiments described herein are generally directed to artificial intelligence (AI), and, more particularly, to AI-based evaluation of patient distress using facial emotion recognition.

Description of the Related Art

Currently, healthcare providers (e.g., a hospital) typically use surveys to monitor patient satisfaction. One such example is the Hospital Consumer Assessment of Healthcare Providers and Systems (HCAHPS), which was developed in the early 2000's. More recently, several companies have begun analyzing user reviews on social media platforms, such as Yelp™, to determine patient satisfaction and identify areas for improvement in healthcare systems. In addition, to evaluate medical deterioration of patients, hospitals currently use various monitors, such as continuous blood pressure or telemetry, to monitor patients at risk for medical deterioration.

SUMMARY

To address deficiencies in these current solutions, systems, methods, and non-transitory computer-readable media are disclosed for AI-based evaluation of patient distress using facial emotion recognition.

In an embodiment, a method is disclosed for monitoring patients in a medical facility. The method may comprise using at least one hardware processor to, for one or more patients in the medical facility: receive one or more facial images of the patient, wherein each of the one or more facial images includes a face of the patient; for each of the one or more facial images, apply an artificial-intelligence model to the facial image to classify the facial image into one of a plurality of emotional states based on a facial expression in the facial image; determine whether or not to alert one or more recipients based on each emotional state into which each of the one or more facial images were classified; and, when determining to alert the one or more recipients, transmit a notification to each of the one or more recipients. Each of the one or more recipients may be a healthcare provider. The artificial-intelligence model may comprise a machine-learning model trained on a plurality of facial images that have each been labeled with one of the plurality of emotional states. The machine-learning model may comprise a convolutional neural network. The method may further comprise using the at least one hardware processor to store the emotional state into which the facial image was classified in memory. The method may further comprise using a camera to capture the facial image, wherein the determination of whether or not to alert one or more recipients is made in real time with the capture of the facial image.

At least one of the plurality of emotional states may indicate satisfaction, and at least one of the plurality of emotional states may indicate dissatisfaction. At least one of the plurality of emotional states may indicate distress. At least one of the plurality of emotional states may indicate pain. At least one of the plurality of emotional states may indicate a risk of medical deterioration.

Determining whether or not to alert one or more recipients may comprise evaluating a plurality of emotional states output by the artificial-intelligence model for each of a plurality of received facial images of the patient. Evaluating the plurality of emotional states may comprise applying an artificial-intelligence model to the plurality of emotional states to determine whether or not to alert the one or more recipients. The artificial-intelligence model that is applied to the plurality of emotional states may comprise a linear regression. The method may further comprise, for each of the one or more patients, capturing the facial image of the patient via a surveillance system in the medical facility. The surveillance system may comprise a camera directed at a hospital bed.

The method may be embodied in executable software modules of a processor-based system, such as a server, and/or in executable instructions stored in a non-transitory computer-readable medium. For example, in an embodiment, a system is disclosed that comprises: at least one hardware processor; and one or more software modules that are configured to, when executed by the at least one hardware processor, for one or more persons, receive one or more facial images of the person, wherein each of the one or more facial images includes a face of the person, for each of the one or more facial images, apply an artificial-intelligence model to the facial image to classify the facial image into one of a plurality of emotional states based on a facial expression in the facial image, determine whether or not to alert one or more recipients based on each emotional state into which each of the one or more facial images were classified, and, when determining to alert the one or more recipients, transmit a notification to each of the one or more recipients. In another embodiment, a non-transitory computer-readable medium is disclosed that has instructions stored therein, wherein the instructions, when executed by a processor, cause the processor to, for one or more persons: receive one or more facial images of the person, wherein each of the one or more facial images includes a face of the person; for each of the one or more facial images, apply an artificial-intelligence model to the facial image to classify the facial image into one of a plurality of emotional states based on a facial expression in the facial image; determine whether or not to alert one or more recipients based on each emotional state into which each of the one or more facial images were classified; and, when determining to alert the one or more recipients, transmit a notification to each of the one or more recipients.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for AI-based evaluation of patient distress using facial emotion recognition. Specifically, the emotions of patients in a medical facility may be monitored in real time, via recognition of emotional expressions on the patients' faces in images, to identify patients who are likely dissatisfied, in distress, and/or at risk of or experiencing medical deterioration. This monitoring may occur passively and continuously via a surveillance system that, in the background, captures images of patients' faces and analyzes the facial expressions, represented in those images, to determine emotional states of the patients. Monitoring patients' emotional states, in this manner, throughout the day or other time period, can help identify patients who may need an intervention or other assistance from healthcare providers. For example, if a patient is predicted to be dissatisfied with his or her overall healthcare experience, a healthcare provider may be dispatched to intervene so as to rectify any issues contributing to the patient's dissatisfaction to thereby improve the patient's overall satisfaction with his or her medical experience. In the event that a patient is determined to be at risk for medical deterioration, a healthcare provider may be dispatched to provide medical care to the patient or otherwise ameliorate any distressing factors, medical complications, and/or the like.

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview 1.1. Infrastructure

Figure 1:
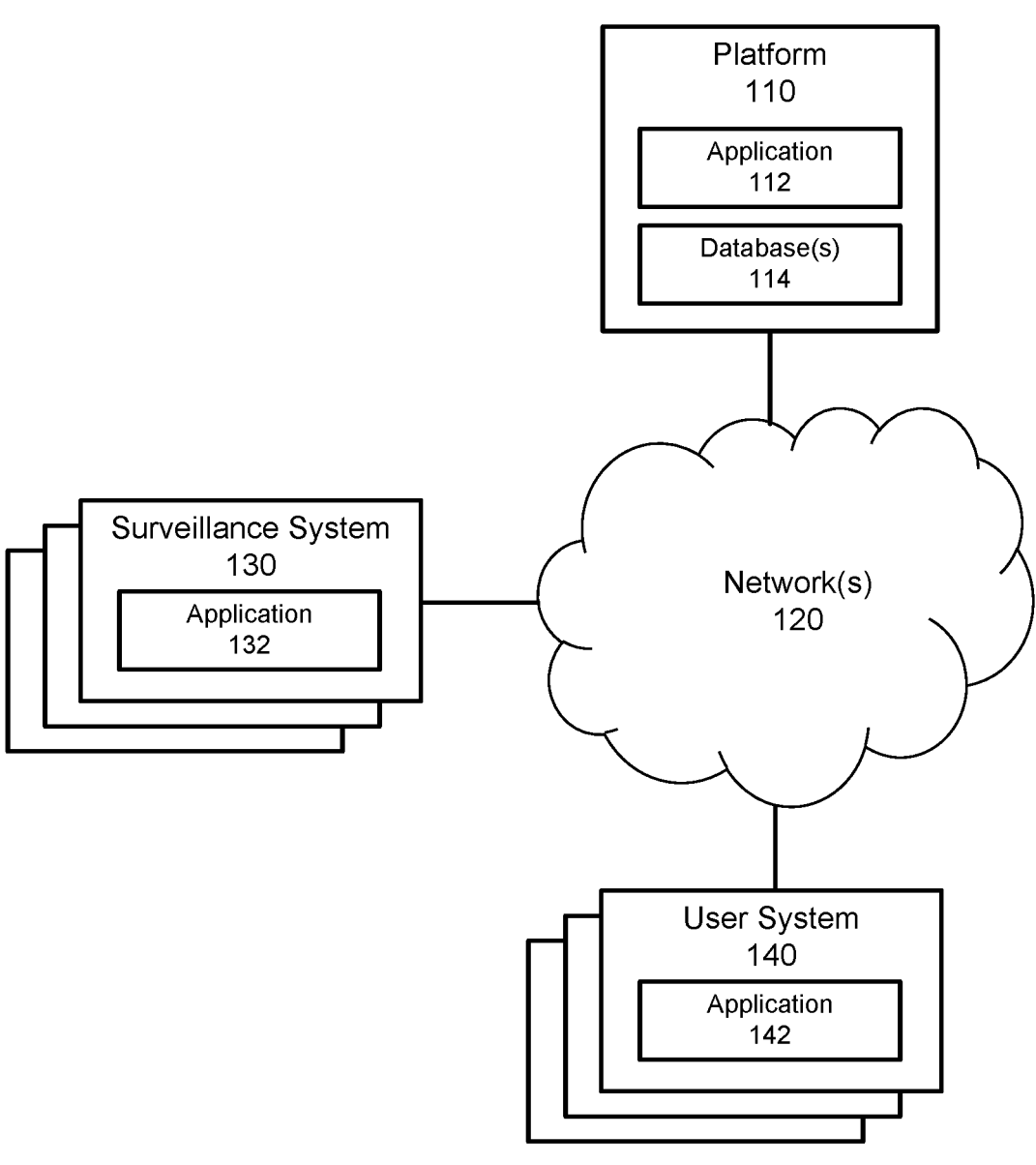
FIG. 1 illustrates an example infrastructure, in which one or more of the processes described herein, may be implemented, according to an embodiment.

FIG. 1 illustrates an example infrastructure in which one or more of the disclosed processes may be implemented, according to an embodiment. The infrastructure may comprise a platform 110 (e.g., one or more servers) which hosts and/or executes one or more of the various functions, processes, methods, and/or software modules described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more surveillance systems 130 via one or more networks 120. Platform 110 may also be communicatively connected to one or more user systems 140 via network(s) 120.

Network(s) 120 may comprise the Internet, and platform 110 may communicate with surveillance system(s) 130 and/or user system(s) 140 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of surveillance systems 130 and/or user systems 140 via the Internet, but may be connected to one or more other surveillance systems 130 and/or user systems 140 via an intranet. Furthermore, while only a few surveillance systems 130 and user systems 140, one server application 112, and one set of database(s) 114 are illustrated, it should be understood that the infrastructure may comprise any number of user systems, external systems, server applications, and databases.

Surveillance system(s) 130 may comprise one or more cameras or other imaging devices. In a contemplated embodiment, each surveillance system 130 is deployed in a hospital environment, and may comprise cameras mounted (e.g., wall, ceiling, counter or desk, etc.) in one or more types of hospital rooms (e.g., waiting room, examination room, emergency room, operating room, delivery room, intensive care unit, patient room, etc.). A surveillance system 130 may comprise a constellation of cameras situated throughout a room and/or hospital. Each camera may be configured to capture image data and transmit the captured image data within surveillance system 130 and/or to platform 110 for analysis.

User system(s) 140 may comprise any type or types of computing devices capable of wired and/or wireless communication, including without limitation, desktop computers, laptop computers, tablet computers, smart phones or other mobile phones, servers, televisions, set-top boxes, electronic kiosks, game consoles, and/or the like. In a contemplated embodiment, user system(s) 140 are deployed in a hospital environment, and may comprise, for example, desktop computers at nurses' or doctors' stations, a hospital server, mobile hand-held devices carried by healthcare professionals (e.g., smartphone, tablet computer, etc.), and/or the like.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 140. In some embodiments, these screens may be served in the form of a wizard, in which case two or more screens may be served in a sequential manner, and one or more of the sequential screens may depend on an interaction of the user or user system 140 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. Platform 110 may also respond to other requests from user system(s) 140.

Platform 110 may further comprise, be communicatively coupled with, or otherwise have access to one or more database(s) 114. For example, platform 110 may comprise one or more database servers which manage one or more databases 114. A surveillance system 130, user system 140, or server application 112 executing on platform 110 may submit data to be stored in database(s) 114, and/or request access to data stored in database(s) 114. Any suitable database may be utilized, including without limitation MySQL™, Oracle™ IBM™, Microsoft SQL™, Access™, PostgreSQL™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external system(s), and provide responses in eXtensible Markup Language (XML), JavaScript Object Notation (JSON), and/or any other suitable or desired format. In such embodiments, platform 110 may provide an application programming interface (API) which defines the manner in which surveillance system(s) 130 and/or user system(s) 140 may interact with the web service. Thus, surveillance system(s) 130 and/or user system(s) 140, can define their own interfaces, and rely on the web service to implement or otherwise provide the backend processes, methods, functionality, storage, and/or the like, described herein.

In an embodiment, a client application 132 executing on one or more surveillance systems 130 and/or a client application 142 executing on one or more user systems 140 may interact with a server application 112 executing on platform 110 to execute one or more or a portion of one or more of the various functions, processes, methods, and/or software modules described herein. Client application 132 and/or 142 may be "thin," in which case processing is primarily carried out server-side by server application 112 on platform 110. A basic example of a thin client application 132 on surveillance system 130 is an application which simply relays images captured by surveillance system 130 to server application 112, optionally with some pre-processing. A basic example of a thin client application 142 on user system 140 is a browser application, which simply requests, receives, and renders webpages at user system(s) 140, while server application 112 on platform 110 is responsible for generating the webpages and managing database functions. Alternatively, client application 132 and/or 142 may be "thick," in which case processing is primarily carried out client-side by surveillance system(s) 130 and/or user system(s) 140, respectively. It should be understood that client application 132 and/or 142 may perform an amount of processing, relative to server application 112 on platform 110, at any point along this spectrum between "thin" and "thick," depending on the design goals of the particular implementation, or, in an alternative embodiment, may perform all of the processing such that platform 110 may be omitted entirely. In any case, the application described herein, which may wholly reside on either platform 110 (e.g., in which case server application 112 performs all processing), surveillance system(s) 130 (e.g., in which case client application tion 132 performs all processing), or be distributed between platform 110 and surveillance system(s) 130 and/or user system(s) 130 (e.g., in which case server application 112 and client application 132 and/or 142 each perform some amount of processing), can comprise one or more executable software modules that implement one or more of the processes of the application described herein.

1.2. Example Processing Device

Figure 2:
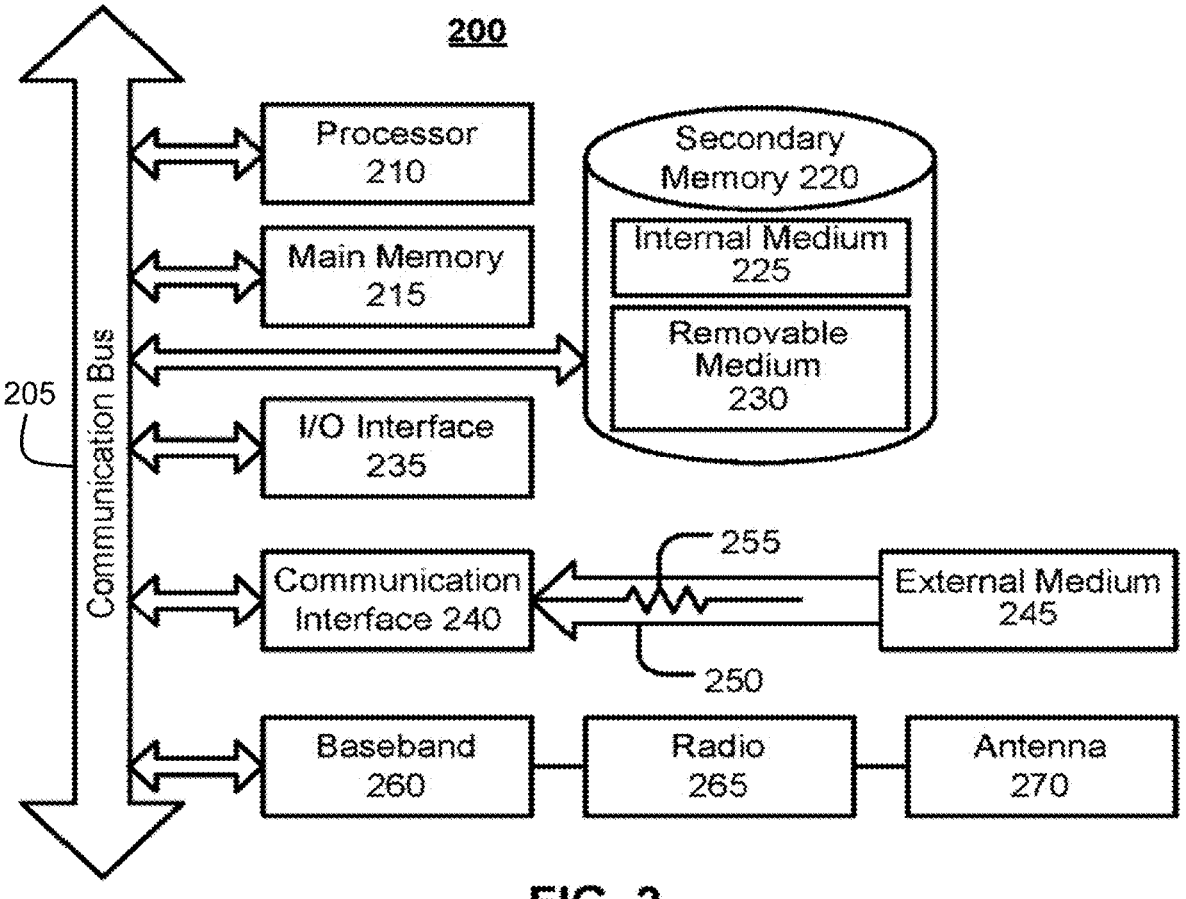
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute the application or one or more software modules of the application) described herein, and may represent components of platform 110, surveillance system(s) 130, user system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/ output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, the Pentium® processor, Core i7® processor, and Xeon® processor, all of which are available from Intel Corporation of Santa Clara, California.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having computer-executable code (e.g., disclosed software modules) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EE-PROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCM-CIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed software modules) is stored in main memory 215 and/or secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of a surveillance system 130 and/or user system 140). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the disclosed software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments.

2. Process Overview

Embodiments of processes for AI-based evaluation of patient distress, using facial emotion recognition, will now be described in detail. It should be understood that the described processes may be embodied in one or more software modules that are executed by one or more hardware processors (e.g., processor 210), for example, as an application comprising server application 112 and/or client application 132. The described processes may be implemented as instructions represented in source code, object code, and/or machine code. These instructions may be executed directly by the hardware processor(s) 210, or alternatively, may be executed by a virtual machine operating between the object code and the hardware processors. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, may be illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

2.1. Artificial Intelligence

In an embodiment, the application utilizes one or more machine-learning models or other artificial intelligence (AI) to perform facial emotion recognition. For example, one or more products provided by AdMobilize™ of Miami, Florida, such as Audience Intelligence, may be used. In this case, surveillance system 130 may comprise the AI Sensor™ product provided by AdMobilize™.

Figure 3:
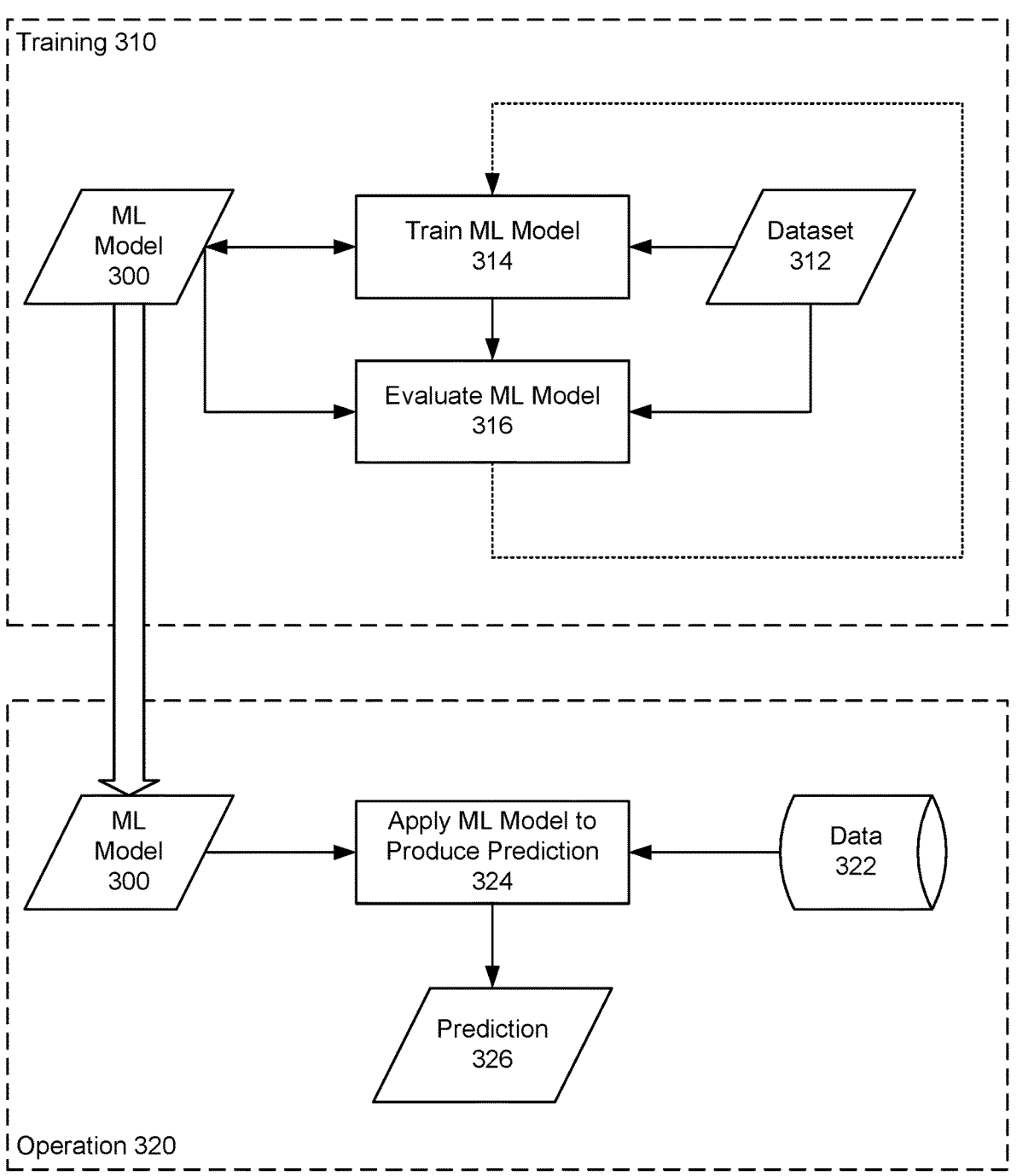
FIG. 3 illustrates a machine-learning process, according to an embodiment.

FIG. 3 illustrates a high-level diagram of machine learning, according to an embodiment. In general, one or more machine-learning models 300 are trained to make predictions in a training stage 310 and operated to make predictions in an operation stage 320. It should be understood that each machine-learning model 300, used by the application, may undergo its own training stage 310 and operation stage 320, and that two or more machine-learning models 300 may operate independently from each other to perform different predictive tasks or may operate in combination with each other to perform a single predictive task.

In training stage 310, a machine-learning (ML) model 300 is trained using a dataset 312. Machine-learning model 300 may be trained using supervised or unsupervised learning. Dataset 512 may comprise images that have been labeled or annotated with the desired recognition or classification output. For example, dataset 512 may comprise images of human faces (referred to herein as "facial images") expressing different emotions. Each of these facial images may be labeled with the emotion which the human face is expressing (e.g., as determined by an expert, survey, crowd-sourcing, etc.). It should be understood that the facial images used in dataset 512 should be similar in terms of pre-processing, size, resolution, quality, backgrounds, color space, and/or other attributes, as the facial images to be evaluated in operation stage 320. Dataset 512 may be cleaned and augmented in any known manner.

In subprocess 314, machine-learning model 300 is trained using dataset 312. Specifically, machine-learning model 300 is applied to dataset 312 (e.g., which may be divided into training and validation datasets) and updates its internal structure (e.g., coefficients, layers, etc.) to minimize the error between the desired output, represented by the labels in dataset 312, and its actual output. Machine-learning model 300 may comprise any type of machine-learning algorithm, including, without limitation, an artificial neural network (e.g., a convolutional neural network, a deep neural network, etc.), inferential statistics, a linear regression, a logistic regression, a decision tree, a random forest algorithm, a support vector machine (SVM), a naïve Bayesian classifier, a k-Nearest Neighbors (kNN) algorithm, a K-Means algorithm, gradient boosting algorithms (e.g., XGBoost, LightGBM, CatBoost), and the like. It should be understood that the particular machine-learning algorithm that is used will depend on the problem being solved, and that different machine-learning algorithms may be used by platform 110 for different tasks. In a contemplated embodiment, machine-learning model 300 comprises a convolutional neural network (CNN) that receives a facial image and predicts an emotion expressed in the facial image.

In subprocess 316, machine-learning model 300 may be evaluated to determine its accuracy in performing the predictive task for which it was designed. If the accuracy is not sufficient, the training stage 310 may continue. For example, a different dataset 312 may be used for training, a different machine-learning algorithm may be used, different hyperparameters for the same machine-learning algorithm may be used, and/or the like, until the evaluation in subprocess 316 demonstrates that machine-learning model 300 is suitably accurate. It should be understood that the necessary accuracy may depend on the specific context in which machine-learning model 300 will be used for prediction.

Once machine-learning model 300 has been trained to a sufficient accuracy, machine-learning model 300 may be moved to operation stage 320 to perform its predictive task on data 322 in a production environment of platform 110. Data 322 may comprise facial images received or otherwise derived from surveillance system(s) 130. In subprocess 324, machine-learning model 300 is applied to data 322 to produce a prediction 326. Prediction 326 may comprise a classification. For example, prediction 326 may consist of a single most likely classification, or may comprise a probability vector comprising confidences for each of a plurality of possible classifications. In this case, each possible classification will represent an emotional state.

In other words, machine-learning model 300 may be trained to classify a facial image into a plurality of possible emotional states. For example, the plurality of possible emotional states may comprise, without limitation, one or more, including potentially all, of the following human emotions: sadness, happiness, fear, surprise, anger, and disgust. It should be understood that any combination of emotional states may be used as the plurality of possible classifications, and that one or more emotional states may be grouped into a single class. For example, the plurality of possible emotion states may comprise: (1) happiness; (2) sadness; (3) fear; (4) surprise; (5) anger; and (6) disgust. As another example, the plurality of possible emotion states may comprise: (1) happiness; (2) sadness; (3) fear or surprise; and (4) anger or disgust. As yet another example, the plurality of possible emotional states may comprise: (1) happiness; and (2) unhappiness (e.g., any one of sadness, fear, surprise, anger, disgust, etc.). As another example, the plurality of possible emotional states may comprise: (1) satisfaction; and (2) dissatisfaction. As another example, the plurality of possible emotional states may comprise different degrees of pain or distress (e.g., none, mild, moderate, severe, etc., or on the pain scale from one to ten). As another example, the plurality of possible emotional states may comprise: (1) no medical deterioration; and (2) medical deterioration.

In an embodiment, machine-learning model 300 may comprise a convolutional neural network that utilizes a softmax function or other operation to produce a vector of N probabilities for a facial image, wherein N is the number of possible emotional states into which a facial image can be classified. Each value in the vector represents a probability that the facial image expresses the emotional state represented by that classification. It should be understood that the values for the entire vector should all sum to one. In an embodiment, machine-learning model 300 may output the vector of probabilities as prediction 326.

Alternatively, machine-learning model 300 may select the emotional state with the highest probability value, from the plurality of possible emotional states, and output the selected emotional state as prediction 326. In an embodiment, if no probability value exceeds a predefined threshold (e.g., 50%, 60%, 75%, 80%, 90%, etc.), machine-learning model 300 may output an indication that the classification is indeterminate as prediction 326. The predefined threshold may be set to a value that is appropriate for the context, with a higher threshold set for more sensitive contexts (e.g., in which a decision made based on prediction 326 will have more of an impact) and a lower threshold set for less sensitive contexts (e.g., in which a decision made based on prediction 326 will have less of an impact). In addition, if two or more probability values are identical, machine-learning model 300 may output an indication that the classification is indeterminate as prediction 326. Alternatively, if two or more probability values are identical, machine-learning model 300 may output both emotion classifications as prediction 326.

2.2. Operation

Figure 4:
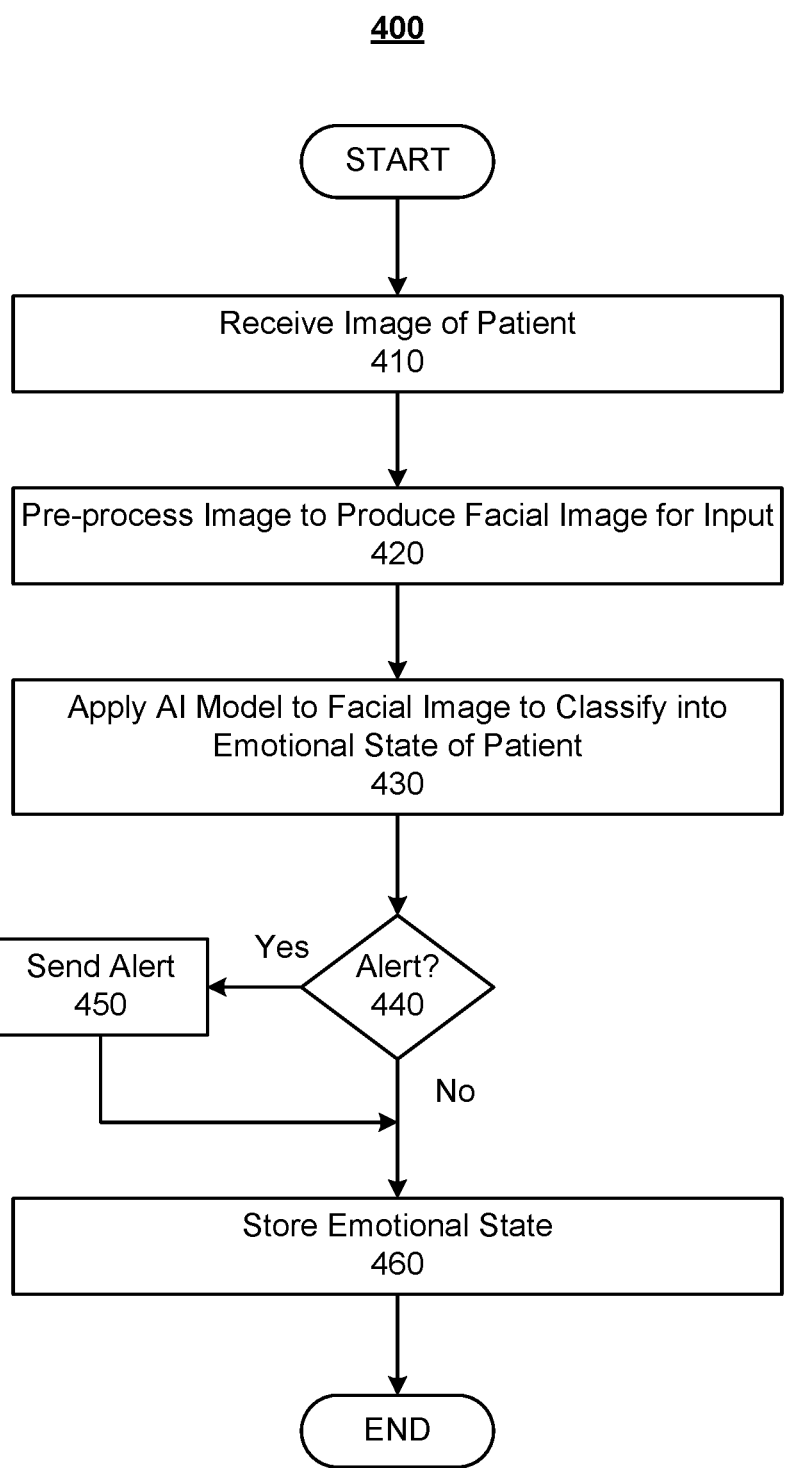
FIG. 4 illustrates a facial emotion recognition process for medical interventions, according to an embodiment.

FIG. 4 illustrates an example process 400 for AI-based evaluation of patient distress using facial emotion recognition, according to an embodiment. Initially, in subprocess 410, an image of a patient is received. The image may be any image that includes the face of the patient, including images that only include the face of the patient and images that include more than just the face of the patient, including the faces of other individuals in the same room as the patient. It should be understood that process 400 may be performed for each of a plurality of images from one patient or a plurality of images from each of a plurality of patients. In addition, process 400 may be performed in real time as the images are captured. As used herein, the term "real time" should be understood to encompass contemporaneity, including near-real time, as dictated by latency in networks and processing. Thus, for example, processing that occurs "in real time" with the capture of an image may be performed slightly after the capture of the image, due to latency in communications and pre-processing of the image.

In subprocess 420, the image, received in subprocess 410, may be pre-processed to produce a facial image for input to an AI model. For example, in the event that the image includes other portions of the patient (i.e., other than the patient's face) and/or a background, the image may be cropped to only include the patient's face or the patient's face with a small region of image data around the patient's face. Additionally or alternatively, other pre-processing may be performed, such as converting the image to grayscale, down-sampling or up-sampling the image to a standard fixed resolution, enhancing contrast in the image, and/or the like. In an alternative embodiment, subprocess 420 could be omitted, such that the image received in subprocess 410 is input directly to the AI model.

In subprocess 430, the AI model (e.g., machine-learning model 300) is applied to the facial image to classify the facial image into one of a plurality of possible emotional states. In the event that machine-learning model 300 is used as the AI model, subprocess 430 corresponds to subprocess 324 in FIG. 3, and the facial images produced in subprocess 420 correspond to data 322 in FIG. 3. As discussed elsewhere herein, the output of subprocess 430 may be a single emotional state that has been predicted by the AI model based on the facial image, or alternatively, a vector of probability values representing the probability that the facial image expresses each of the plurality of possible emotional states.

In subprocess 440, it is determined whether or not an alert is warranted based on the output of subprocess 430. An alert may be warranted when the emotional state into which the patient has been classified indicates that the patient is unhappy or sad, angry, fearful, in moderate or severe pain or distress, at risk of medical deterioration, at risk of being dissatisfied with their medical encounter, and/or any other emotional state that may indicate the patient needs an intervention from a healthcare professional (e.g., doctor, nurse, mental health professional, etc.).

In an embodiment, subprocess 440 may comprise evaluating only a current emotional state of the patient output by subprocess 430 in real time. Alternatively, subprocess 440 may comprise evaluating a plurality of emotional states of the patient output by subprocess 430 over a period of time up to and including the current time. In this case, an alert may be warranted only if the plurality of emotional states, looking back over a window of time from the current time (e.g., five minutes, ten minutes, fifteen minutes, thirty minutes, one hour, twelve hours, twenty-four hours, etc.), indicate a consistent state of distress. For example, subprocess 440 may determine that an alert is warranted if a certain threshold percentage (e.g., 50%, 60%, 70%, 80%, 90%, etc.) of the emotional states in the look-back window indicate distress, or if a certain threshold number of consecutive emotional states indicate distress. As another example, subprocess 440 may determine that an alert is warranted if consecutive emotional states indicate medical deterioration (e.g., the level of emotional distress is increasing over the time window). Alternatively, some other algorithm, including an AI model (e.g., machine-learning model 300, a linear regression, etc.), may be applied to the plurality of emotional states in the window of time to determine if an alert is warranted.

To this end, facial images of a patient may be captured and classified periodically, in accordance with the capabilities of surveillance system 130. For example, surveillance system 130 may capture continuous video of the patient's face and may evaluate every image frame in the video or only a subset of image frames in the video (e.g., image frames at fixed intervals representing milliseconds, seconds, minutes, etc.). Alternatively, surveillance system 130 may capture digital photographs of the patient's face at fixed intervals (e.g., every second, every few seconds, every minute, etc.).

If an alert is determined to be warranted (i.e., "Yes" in subprocess 440), an alert is sent to the relevant healthcare professional(s) in subprocess 450. The alert may comprise any form of communication, such as a notification to a user system 140 associated with a healthcare professional to be alerted and displayed via client application 142 on a display of the user system 140 (e.g., desktop or tablet computer), a text message to a user system 140 associated with a healthcare professional to be alerted (e.g., Short Message Service (SMS) or Multimedia Messaging Service (MMS) message to a smartphone), an email message to an email address associated with a healthcare professional to be alerted, and/or the like. Conversely, if an alert is determined not to be warranted (i.e., "No" in subprocess 440), no alert is sent.

In subprocess 460, the emotional state output by subprocess 430 may be stored, regardless of whether or not an alert was sent in subprocess 450. Thus, it should be understood that subprocess 460 may occur before, simultaneously or contemporaneously with, or after subprocesses 440 and 450. As images are processed by process 400 for a given facility (e.g., hospital or hospital unit), a history of emotional states of patients of that facility will be collected (e.g., in database 114) over time. This history of emotional states can be analyzed to evaluate the facility's performance (e.g., in terms of a specific patient's or all patients' satisfaction and/or deterioration) over time.

It should be understood that process 400 may be performed by server application 112, client application 132, or a combination of server application 112 and client application 132. For example, in a server-side embodiment, server application 112 performs the entirety of process 400. In a thin-client embodiment, client application 132 may perform subprocess 410, and server application 112 may perform subprocesses 420-460. Alternatively, client application 132 may perform subprocesses 410 and 420, and server application 112 may perform subprocesses 430-460. In a thick-client embodiment, client application 132 may perform subprocesses 410-430, and server application may perform subprocesses 440-460. Alternatively, client application 132 may perform subprocesses 410-440, and server application 112 may perform subprocesses 450 and 460. As yet another alternative, client application 132 may perform subprocesses 410-450, and server application 112 may perform subprocess 460. In any of these embodiments, client application 132 may communicate with server application 112 via an API. In a client-side embodiment, client application 132 may perform the entirety of process 400. However, it is contemplated that the server-side embodiment or thin-client embodiment will generally be the most cost effective and easiest to install and maintain for a facility.

2.3. Data Flow

Figure 5:
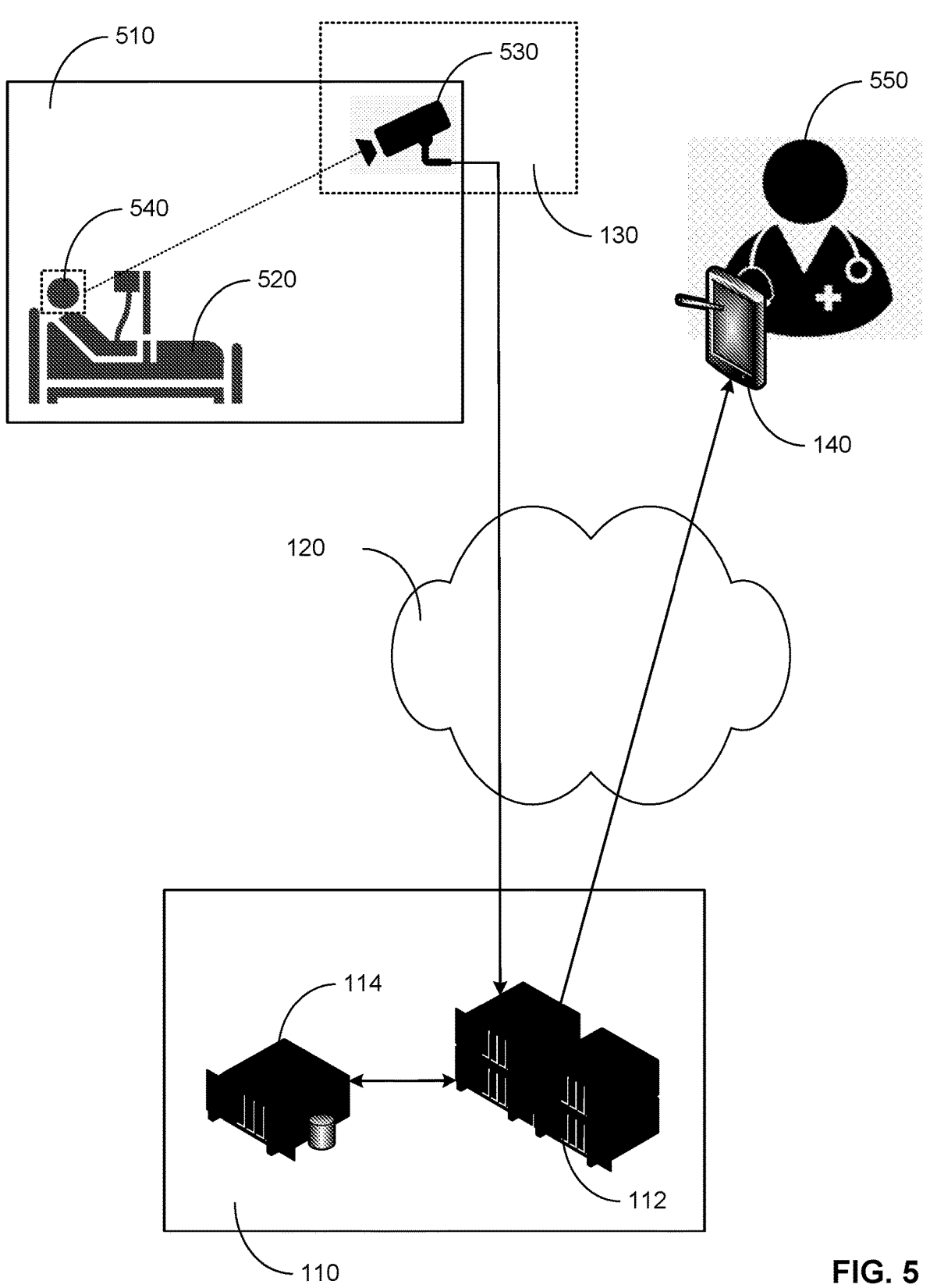
FIG. 5 illustrates an AI-based data flow, according to an embodiment.

FIG. 5 illustrates an example data flow for AI-based evaluation of patient distress using facial emotion recognition, according to an embodiment. For this example, it is assumed that a patient 520 is in a room 510 in a medical facility (e.g., a hospital). While room 510 is illustrated as a patient's room and patient 520 is illustrated in a hospital bed, it should be understood that patient 520 may be in any stage of medical treatment, and room 510 may be any room in a medical facility. For example, patient 520 could be sitting in a chair or standing in a waiting room, lying on a gurney in an emergency room, operating room, or hallway, walking down a hallway, pacing in a room, and/or the like. Embodiments do not depend on the particular state or position of patient 520 or on the particular room 510 occupied by patient 520.

Room 510 may be equipped with at least a portion of a surveillance system 130. For example, surveillance system 130 may comprise a camera 530 that is configured to capture an image 540 of patient 520 that includes the patient's face. In the case that room 510 is a patient's room, camera 530 may be aimed at the head of the hospital bed so as to capture a facial image 540 of patient 520. In other types of rooms, cameras 530 may be aimed at areas which are likely to be inhabited by a patient's face (e.g., above a waiting room chair) or may be capable of moving (e.g., rotating in one or more directions) so as to track patients' faces or continually sweep a room for patients' faces.

It should be understood that camera 530 may be configured to capture an image 540 that includes more than a patient's face (e.g., the patient's entire body), as long as the patient's face can be extracted from the image. This extraction may be performed at camera 530 (e.g., by a processor 210 of camera 530) or at another component of surveillance system 130 (e.g., by a processor 210 of a local server of surveillance system 130). Alternatively, camera 530 may transmit the image to platform 110, and application 112 may receive image 540 and extract a portion of the received image 540 containing the face (e.g., by a processor 210 of platform 110).

In either case, standard facial recognition techniques may be used to recognize a face in image 540. A bounding box may be formed around the face, and image 540 may be cropped to the bounding box in order to extract the face. Alternatively or additionally, other types of pre-processing may be performed to the image before and/or after extraction of the face. It should be understood that this extraction and/or other pre-processing represents subprocess 420 in process 400.

In a thin-client embodiment, surveillance system 130 may transmit facial image 540, captured by camera 530, through network(s) 120 to server application 112 (e.g., executed by an application server) on platform 110. Server application 112 may then perform subprocesses 410-460 of process 400. Subprocess 450 may comprise notifying a healthcare professional 540 via an associated user system 140 that patient 540 needs a medical intervention or other assistance. Subprocess 460 may comprise server application 112 storing the determined emotional state for a facial image 540 into a history of emotional states in database 114 (e.g., via a database server, which may be a cloud-based server).

In an embodiment, histories of emotional states may be associated to specific patients. For example, if a camera 530 of surveillance system 130 is positioned to continually capture images of the same patient, all of the images from camera may be associated with the same patient. Additionally or alternatively, facial recognition may be performed on all of the images to group images of the same patient together (i.e., based on the faces in those images matching each other). Facial recognition may also be performed on anyone who enters the same room or area as the patient.

In a thick-client embodiment, surveillance system 130 may perform subprocesses 410-430. In this case, surveillance system 130 may transmit the output of the AI model (e.g., machine-learning model 300) to server application 112. Server application 112 may then perform subprocesses 440-460 in the same manner as described above. Alternatively, surveillance system 130 could perform subprocesses 440 and 450, such that surveillance system 130 notifies a healthcare professional 540 via an associated user system 140 that patient 540 needs assistance, without the aid of platform 110. In addition, surveillance system 130 could perform subprocess 460, such that platform 110 can be omitted altogether.

2.4. Analytics

In an embodiment, emotional states for a plurality of patients may be collected in a database (e.g., database 114 of platform 110). In the case that a plurality of emotional states is collected for individual patients, these emotional states may be aggregated into an overall distress metric for each individual patient (e.g., based on a percentage of time spent in each emotional state). For example, an algorithm may be used to convert the emotional states for a patient into a distress score (e.g., using a weighted average of time spent in each emotional state).

These distress scores may be used to calculate an overall distress score or other rating for a medical facility. Advantageously, this rating is based on observed, objective satisfaction of verified patients in real time, rather than the subjective opinions of self-selecting patients recalled from memory generally well after they have been discharged.

3. Applicability to Other Contexts

Embodiments have been described herein primarily in the context of determining emotional states of patients in a medical facility. However, the present embodiments may be applied to any context which may benefit from identifying dissatisfaction or distress in people. For example, surveillance system 130 may be installed in a retail store to identify dissatisfied customers, using facial images as input to the disclosed artificial intelligence, and dispatch sales personnel to customers who have been identified as dissatisfied. As another example, surveillance system 130 may be installed in a corporate office to identify disgruntled employees, using facial images as input to the disclosed artificial intelligence, and dispatch personnel from human resources or mental health professionals to the employees who have been identified as disgruntled. Notably, the disclosed embodiments do not have to be modified in any substantial way to operate in these other contexts, since facial images captured in these contexts are generally no different than facial images captured in the healthcare context, and notifications sent in these contexts can be similar to notifications sent in the healthcare context.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method for monitoring patients in a medical facility comprising using at least one hardware processor to, for each of one or more patients in the medical facility:

receive a plurality of facial images of the patient over a period of time, wherein each of the plurality of facial images includes a face of the patient;

generate a history of emotional states for the patient by, for each of the plurality of facial images, providing a facial image of the plurality of facial images as input into a first artificial-intelligence model, wherein the first artificial-intelligence model generates an output comprising a classification of the facial image into one of a plurality of emotional states based on a facial expression in the facial image, wherein the plurality of emotional states comprise a plurality of emotions;

evaluate the history of emotional states by providing the history of emotional states as input into a second artificial-intelligence model, wherein the second artificial-intelligence model generates an output indicative of an emotional state of the patient, wherein the second artificial-intelligence model is different from the first artificial-intelligence model;

based upon the output of the second artificial-intelligence model, determine whether or not to alert one or more recipients; and upon determining to alert the one or more recipients, transmit a notification to each of the one or more recipients.

2. The method of claim 1, wherein the first artificial-intelligence model comprises a machine-learning model trained on a plurality of facial images that have each been labeled with one of the plurality of emotional states.

3. The method of claim 2, wherein the machine-learning model comprises a convolutional neural network.

4. The method of claim 1, further comprising using the at least one hardware processor to store the history of emotional states in memory.

5. The method of claim 4, wherein the one or more patients are a plurality of patients, and wherein the method further comprises using the at least one hardware processor to analyze the histories of emotional states, stored in the memory, across all of the plurality of patients, over time, to calculate an overall performance rating for the medical facility.

6. The method of claim 1, further comprising using a camera to capture each of the plurality of facial images, wherein the determination of whether or not to alert one or more recipients is made in real time with the capture of the plurality of facial images.

7. The method of claim 1, wherein at least one of the plurality of emotional states indicates satisfaction, and at least one of the plurality of emotional states indicates dissatisfaction.

8. The method of claim 1, wherein at least one of the plurality of emotional states indicates distress.

9. The method of claim 8, wherein at least one of the plurality of emotional states indicates pain.

10. The method of claim 1, wherein at least one of the plurality of emotional states indicates a risk of medical deterioration.

11. The method of claim 1, wherein the second artificial-intelligence model comprises a linear regression.

12. The method of claim 1, wherein each of the one or more recipients is a healthcare provider.

13. The method of claim 12, further comprising, for each of the one or more patients, capturing the plurality of facial images of the patient via a surveillance system in the medical facility.

14. The method of claim 13, wherein the surveillance system comprises a camera directed at a hospital bed.

15. The method of claim 1, wherein the output of the second artificial-intelligence model comprises a threshold percentage of an emotional state of the plurality of emotional states indicative of emotional distress.

16. A system comprising:

at least one hardware processor; and one or more software modules that are configured to, when executed by the at least one hardware processor, for each of one or more persons, receive a plurality of facial images of the patient over a period of time, wherein each of the plurality of facial images includes a face of the person;

generate a history of emotional states for the patient by, for each of the plurality of facial images, providing a facial image of the plurality of facial images as input into a first artificial-intelligence model, wherein the first artificial-intelligence model generates an output comprising a classification of the facial image into one of a plurality of emotional states based on a facial expression in the facial image, wherein the plurality of emotional states comprise a plurality of emotions;

evaluate the history of emotional states by providing the history of emotional states as input into a second artificial-intelligence model, wherein the second artificial-intelligence model generates an output indicative of an emotional state of the patient, wherein the second artificial-intelligence model is different from the first artificial-intelligence model;

based upon the output of the second artificial-intelligence model, determine whether or not to alert one or more recipients; and upon determining to alert the one or more recipients, transmit a notification to each of the one or more recipients.

17. The system of claim 16, wherein at least one of the plurality of emotional states indicates a risk of medical deterioration.

18. The system of claim 16, further comprising using a camera to capture each of the plurality of facial images, wherein the determination of whether or not to alert one or more recipients is made in real time with the capture of the plurality of facial images.

19. The system of claim 18, further comprising, for each of the one or more patients, capturing the plurality of facial images of the patient via a surveillance system in the medical facility.

20. A non-transitory computer-readable medium having instructions stored therein, wherein the instructions, when executed by a processor, cause the processor to, for each of one or more persons:

receive a plurality of facial images of the patient over a period of time, wherein each of the plurality of facial images includes a face of the person;

generate a history of emotional states for the patient by, for each of the plurality of facial images, providing a facial image of the plurality of facial images as input into a first artificial-intelligence model, wherein the first artificial-intelligence model generates an output comprising a classification of the facial image into one of a plurality of emotional states based on a facial expression in the facial image, wherein the plurality of emotional states comprise a plurality of emotions;

evaluate the history of emotional states by providing the history of emotional states as input into a second artificial-intelligence model, wherein the second artificial-intelligence model generates an output indicative of an emotional state of the patient, wherein the second artificial-intelligence model is different from the first artificial-intelligence model;

based upon the output of the second artificial-intelligence model, determine whether or not to alert one or more recipients; and upon determining to alert the one or more recipients, transmit a notification to each of the one or more recipients.

* * * * *